(12) United States Patent
Ribarov et al.

(10) Patent No.: US 10,987,617 B2
(45) Date of Patent: Apr. 27, 2021

(54) PRESSURE DETECTION SYSTEM IMMUNE TO PRESSURE RIPPLE EFFECTS (71) Applicant: Hamilton Sundstrand Corporation, Charlotte, NC (US)

(72) Inventors: Lubomir A. Ribarov, West Hartford, CT (US); Richard J. Carpenter, Gales Ferry, CT (US); Aaron V. Price, Westfield, MA (US); Gary M. McBrien, S. Glastonbury, CT (US); Aaron F. Rickis, Feeding Hills, MA (US); Bryan V. Scala, Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 320 days.

(21) Appl. No.: 15/091,023

(22) Filed: Apr. 5, 2016

(65) Prior Publication Data

US 2017/0282101 A1   Oct. 5, 2017

(51) Int. Cl.
*B01D 35/143* (2006.01)
*B01D 35/00* (2006.01)
(Continued)

(52) U.S. Cl.
CPC .......... *B01D 35/143* (2013.01); *B01D 29/114* (2013.01); *B01D 29/606* (2013.01);
(Continued)

(58) Field of Classification Search
CPC .... B01D 35/143; B01D 35/00; B01D 35/005; B64D 37/32; G01L 19/147; G01L 19/14
(Continued)

(56) References Cited

U.S. PATENT DOCUMENTS 4,272,368 A   6/1981   Foord et al.
4,314,621 A   2/1982   Hansen
(Continued)

FOREIGN PATENT DOCUMENTS

DE   102011005943 A1   9/2012
EP      0460105 A1   12/1991
(Continued)

OTHER PUBLICATIONS

European Search Report Issued in EP Application No. 17164583.1, dated Aug. 2, 2017.

*Primary Examiner* — Robert Clemente
*Assistant Examiner* — Akash K Varma
(74) *Attorney, Agent, or Firm* — Cantor Colburn LLP (57) ABSTRACT

A filter assembly for a fluid flow system includes a filter housing, a housing inlet to allow the fluid flow into the filter housing and a housing outlet to allow the fluid flow to exit the filter housing. A filter element is located in the filter housing to collect contaminants from the fluid flow. A pressure sensor is located to measure a pressure drop across the filter element. The pressure sensor includes at least one sense line extending into an interior volume of the filter housing. A method of monitoring a filter assembly for a fluid flow system includes positioning a pressure sensor at a filter assembly, extending at least one sense line from the pressure sensor into an internal volume of a filter housing of the filter assembly, and measuring a pressure drop across a filter element of the filter assembly via the pressure sensor.

18 Claims, 5 Drawing Sheets

(51) Int. Cl.
  *B64D 37/32* (2006.01)
  *G01L 19/14* (2006.01)
  *B01D 29/60* (2006.01)
  *B01D 29/11* (2006.01)
(52) U.S. Cl.
  CPC ........... *B01D 35/005* (2013.01); *B64D 37/32* (2013.01); *G01L 19/147* (2013.01)
(58) Field of Classification Search
  USPC .......................................................... 210/90
  See application file for complete search history.

(56) References Cited

U.S. PATENT DOCUMENTS

| | | | |
|---|---|---|---|
| 5,475,976 A | 12/1995 | Phillips | |
| 5,531,513 A | 7/1996 | Tackett | |
| 5,588,805 A | 12/1996 | Geringer | |
| 5,709,079 A | 1/1998 | Smith | |
| 5,858,224 A | 1/1999 | Schwandt et al. | |
| 6,234,758 B1 | 5/2001 | Pawelski | |
| 6,703,937 B1* | 3/2004 | Franz | B01D 46/0086 340/607 |
| 6,854,269 B2 | 2/2005 | Hale | |
| 7,036,530 B2 | 5/2006 | Chen et al. | |
| 7,325,570 B1 | 2/2008 | Krieger | |
| 7,640,919 B1 | 1/2010 | Smith | |
| 7,922,914 B1* | 4/2011 | Verdegan | B01D 37/046 210/741 |
| 8,656,772 B2* | 2/2014 | Qasimi | B01D 17/10 73/204.21 |
| 9,152,151 B2 | 10/2015 | Olbrisch et al. | |
| 2006/0130919 A1 | 6/2006 | Ehmann et al. | |
| 2012/0060482 A1 | 3/2012 | Gonze et al. | |
| 2012/0234014 A1* | 9/2012 | Reuter | F02C 7/236 60/773 |
| 2012/0234770 A1 | 9/2012 | Goodwin | |
| 2013/0239802 A1* | 9/2013 | Troxell | B01D 46/0086 95/20 |
| 2014/0294601 A1 | 10/2014 | O'Shea et al. | |

FOREIGN PATENT DOCUMENTS

| | | |
|---|---|---|
| FR | 2997024 A1 | 4/2014 |
| WO | 0201055 A1 | 1/2002 |
| WO | 2005098227 A1 | 10/2005 |

\* cited by examiner

PRESSURE DETECTION SYSTEM IMMUNE TO PRESSURE RIPPLE EFFECTS

BACKGROUND

The subject matter disclosed herein relates to fluid flow systems. More particularly, the present disclosure relates to fluid pressure detection in aircraft fuel and/or oil distribution systems.

Aircraft fuel and oil distribution systems typically incorporate external gear pumps to urge flow of fuel or oil through the systems. The external gear pump, however, is often the source of a pressure ripple, an oscillation generated by the periodic meshing and unmeshing of the teeth of the external gear pump. An operating external gear pump can expose a fluid system to this oscillating pressure both on the inlet and outlet sides of the pump. Further, while discussed herein with regard to external gear pumps, pressure ripple effects often also exist in systems utilizing centrifugal pumps or positive displacement pumps. Both flow and pressure ripples exist with these pumps, but it is the pressure ripple that can be very problematic to components within a fluid system.

Typically to protect a fluid system, and in particular the pump(s), a filtration system is employed to remove harmful contaminants from the fluid flow that could damage fluid system components. The filtration system usually incorporates a filter element that acts as a barrier to collect any contaminants that are blocked by the filter. A clean filter will cause a small pressure drop for fluid to pass through it. As the filter collects contaminants during the regular operation of the fluid system, this pressure drop will increase. If not monitored and actively managed, the filter could become sufficiently blocked to the point which it could block a significant amount of flow thus causing the pump to be too starved of fluid to properly function.

Many conventional fluid systems include a bypass circuit function for this scenario, in which when flow through the filter is sufficiently blocked, fluid will bypass the filter entirely, so to not impede pump operation and system function. This solution, however, means allowing contaminated fluids to be passed into the system and this is typically undesirable for normal operation. Further, unwanted bypass events may occur when the fluid is at a low temperature (i.e. high viscosity) resulting in an increased pressure drop across the filter sufficient enough to actuate a bypass valve. Such events also allow unfiltered flow past the filter.

To manage this, the pressure drop across the filter element is usually monitored. This is typically accomplished by use of a delta-pressure measurement from a single sensor as this arrangement tends to be more accurate than the use of two absolute pressure sensors. Managing the pressure drop when a filter element collects material and increases its pressure drop usually means that the filter element needs to be a maintainable/replaceable component. This service requirement drives the design of a filter bowl or manifold to allow quick and easy removal and replacement of the contaminated filter.

Figure 1:
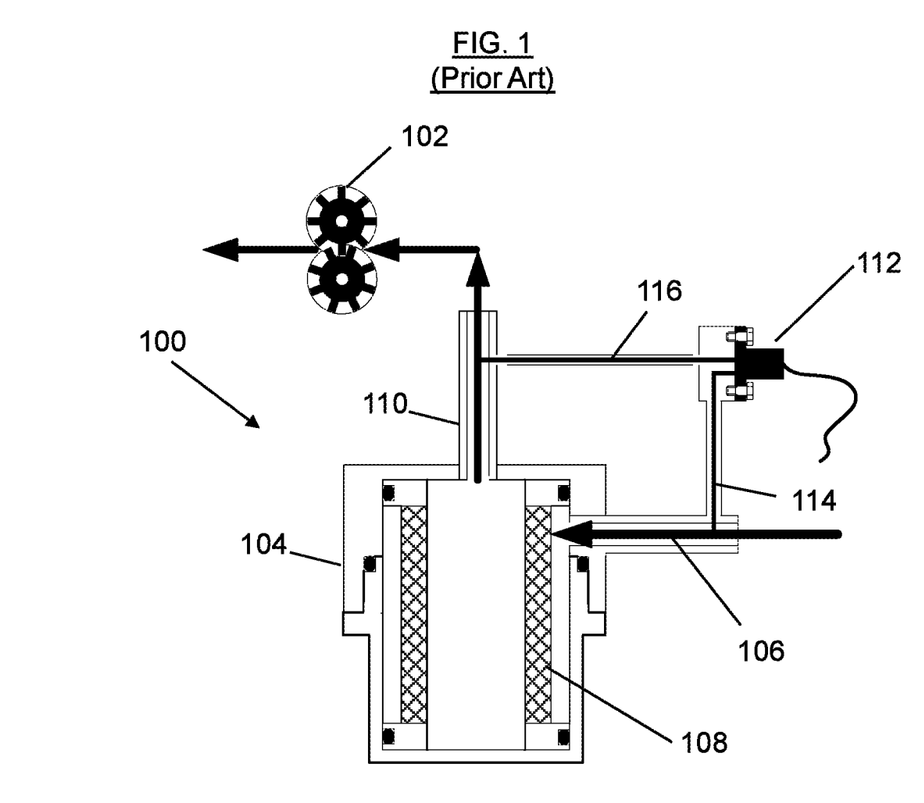
FIG. 1 is a schematic view of a typical fluid flow system.

A schematic view of a typical fluid flow system 100 is shown in FIG. 1. The fluid flow system 100 includes a pump element 102 and a filter assembly 104 located fluidly upstream of the pump element 102. A fluid input line 106 directs a fluid flow into the filter assembly 104, where the fluid flow passes through a filter element 108 and exits the filter assembly 104 at a fluid output line 110. A delta pressure sensor 112 is utilized to measure the pressure drop across the filter assembly 104. The delta pressure sensor 112 senses pressure of the fluid flow upstream of the filter assembly 104 via an upstream sense line 114, located at the fluid input line 106. Further, the delta pressure sensor 112 senses pressure of the fluid flow downstream of the filter assembly 104 via a downstream sense line 116, located at the fluid output line 110. Thus, the delta pressure sensor 112 measures the pressure drop across the filter assembly 104 indirectly via sense lines 114, 116 located remotely from the filter assembly 104.

Fluid pressure sensors are notoriously unreliable and as such these parts are designed to be accessible to be readily removed and replaced as needed. As a result the delta pressure sensor 112 may be located at a long distance away from the filter assembly 104. As such, the sense lines 114, 116 are added to connect the remotely located delta pressure sensor 112 to the filter assembly 104. These long sense lines 114, 116 between the fluid components couple the measurement of the pressure drop across the filter to a pressure that the sensor can measure in a remote location. These sense lines 114, 116 can prove problematic as they may be very long. An increase in the length of these sense lines 114, 116 may result in an undesirable system dynamic response that can result in physical damage to the sensor and signal distortion.

Typical fluid filter design that allows the filter element 108 to be readily maintained drives the pressure sensor sense lines ports not to be located at the filter assembly 104. Location of the delta pressure sensor's sense lines 114, 116 at the inlet or outlet port of fluid filter can also be problematic. The fluid filter inlet and outlet ports can contain physical features that can result in the sudden expansion or contraction of the flow. Pressure sensor sense lines 114, 116 located in the boundary layer or wake flow can result in the measurement of pressure that is not representative of the true pressure drop across the filter assembly 104. This flow may also be turbulent and could also act as a cyclic pressure fluctuation similar to pressure ripple as mentioned from pump elements 102 within the fluid system 100. Incorrect location of the sense lines 114, 116 may result in an inaccurate pressure drop measurement and also undesirable system dynamic response.

SUMMARY

In one embodiment, a filter assembly for a fluid flow system includes a filter housing, a housing inlet to allow the fluid flow into the filter housing and a housing outlet to allow the fluid flow to exit the filter housing. A filter element is located in the filter housing to collect contaminants from the fluid flow. A pressure sensor is located to measure a pressure drop across the filter element. The pressure sensor includes at least one sense line extending into an interior volume of the filter housing.

Additionally or alternatively, in this or other embodiments the measured pressure drop is indicative of an amount of blockage of the filter element due to contaminants collected at the filter element.

Additionally or alternatively, in this or other embodiments the pressure sensor is located at the filter housing.

Additionally or alternatively, in this or other embodiments the housing inlet and the housing outlet are located at a first end of the filter housing, and the at least one sense line extends into the interior volume at a second end of the filter housing opposite the first end.

Additionally or alternatively, in this or other embodiments the pressure sensor includes a first half-bridge pressure sensor and a second half-bridge pressure sensor. The first half-bridge pressure sensor and the second half-bridge pressure sensor are operably connected to output a pressure drop across the filter element.

Additionally or alternatively, in this or other embodiments the pressure sensor includes a first absolute pressure sensor and a second absolute pressure sensor. The first absolute pressure sensor and the second absolute pressure sensor are operably connected to output a pressure drop across the filter element.

In another embodiment, a fluid flow system includes a fluid pathway, a pump element located at the fluid pathway to urge a fluid flow through the fluid pathway and a filter assembly located at the fluid pathway upstream of the pump element relative to a direction of fluid flow through the fluid pathway. The filter assembly includes a filter housing, a housing inlet connected to the fluid pathway to allow the fluid flow into the filter housing from the fluid pathway and a housing outlet connected to the fluid pathway to allow the fluid flow to exit the filter housing to the fluid pathway. A filter element is located in the filter housing to collect contaminants from the fluid flow. A pressure sensor is positioned to measure a pressure drop across the filter element. The pressure sensor includes one or more sense lines extending into an interior volume of the filter housing.

Additionally or alternatively, in this or other embodiments the measured pressure drop is indicative of an amount of blockage of the filter element due to contaminants collected at the filter element.

Additionally or alternatively, in this or other embodiments the pressure sensor is located at the filter housing.

Additionally or alternatively, in this or other embodiments the housing inlet and the housing outlet are positioned at a first end of the filter housing, and the at least one sense line extends into the interior volume at a second end of the filter housing opposite the first end.

Additionally or alternatively, in this or other embodiments the pressure sensor includes a first half-bridge pressure sensor and a second half-bridge pressure sensor. The first half-bridge pressure sensor and the second half-bridge pressure sensor are operably connected to output a pressure drop across the filter element.

Additionally or alternatively, in this or other embodiments the pressure sensor includes a first absolute pressure sensor and a second absolute pressure sensor. The first absolute pressure sensor and the second absolute pressure sensor are operably connected to output a pressure drop across the filter element.

Additionally or alternatively, in this or other embodiments the pump element is an external gear pump.

Additionally or alternatively, in this or other embodiments the fluid flow system is a fuel system for an aircraft.

Additionally or alternatively, in this or other embodiments the fluid pathway extends from a fuel tank to an aircraft engine.

In yet another embodiment, a method of monitoring a filter assembly for a fluid flow system includes positioning a pressure sensor at a filter assembly, extending at least one sense line from the pressure sensor into an internal volume of a filter housing of the filter assembly, and measuring a pressure drop across a filter element of the filter assembly via the pressure sensor. The measured pressure drop is indicative of an amount of blockage of the filter element due to contaminants collected at the filter element.

Additionally or alternatively, in this or other embodiments the measured pressure drop is compared to a selected threshold, and maintenance or replacement operations are performed on the filter assembly if the measured pressure drop exceeds the threshold.

Additionally or alternatively, in this or other embodiments a first pressure is measured via a first half-bridge pressure sensor disposed at the filter housing, and a second pressure is measured via a second half-bridge pressure sensor disposed at the filter housing. A difference between the first pressure and the second pressure define the pressure drop across the filter element. The first half-bridge pressure sensor and the second half-bridge pressure sensor together define the pressure sensor.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 2:
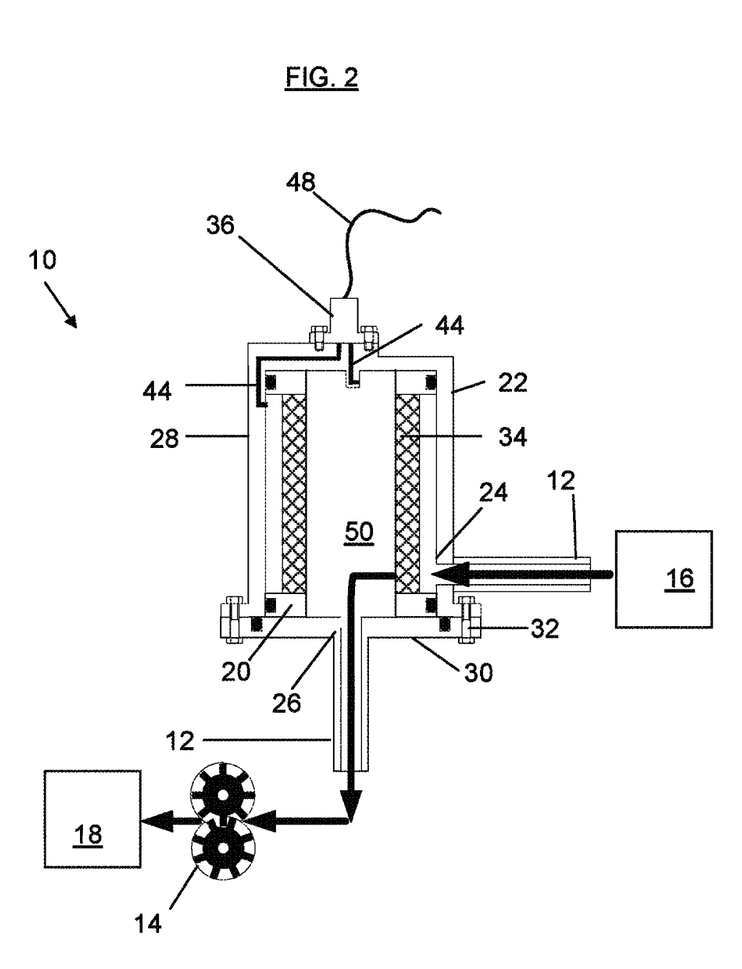
FIG. 2 is a schematic view of an embodiment of a filter and pressure monitor system for a fluid flow system of an aircraft.

Referring now to FIG. 2, illustrated is a portion of a fluid flow system 10, for example, a fuel system or oil system for an aircraft or other application. The fluid flow system 10 includes a fluid pathway 12 and a pump element 14 disposed at the fluid pathway 12 to urge a fluid, for example, fuel or oil, along the fluid pathway 12. In some embodiments, such as shown, the pump element 14 is an external gear pump, while in other embodiments the pump element 14 may be, for example, a centrifugal pump or a positive displacement pump. The fluid pathway 12 may, for example, convey a flow of fuel from a fuel tank 16 to an aircraft engine 18.

A filter assembly 20 is located along the fluid pathway 12 upstream of the pump element 14, relative to a direction of fluid flow through the fluid pathway 12. The filter assembly 20 is utilized to remove contaminants from the fluid flow to protect the pump element 14 and other downstream components, for example, aircraft engine 18 components from damage caused by contaminants in the fluid flow. The filter assembly 20 includes a filter housing 22 having a housing inlet 24 and a housing outlet 26. The housing inlet 24 and the housing outlet 26 are connected to the fluid pathway 12 to allow the fluid flow to flow into and out of the filter housing 22 via the housing inlet 24 and the housing outlet 26. In some embodiments, the filter housing 22 includes a housing sidewall 28 and further includes a housing end cover 30 located at an end of the housing sidewall 28. In some embodiments, the filter housing 22 is substantially cylindrical in shape. The end cover 30 is removable from the housing sidewall 28 via, for example, a threaded interface 32 between the housing sidewall 28 and the end cover 30. Removing the end cover 30 allows for access to an interior of the filter housing 22 for maintenance or replacement of a filter element 34 located in the filter housing 22. In operation, fluid flow enters the filter housing 22 via the housing inlet 24 and flows across the filter element 34, which captures contaminants in the fluid flow and removes them from the fluid flow. The fluid flow proceeds out of the filter housing 22 via the housing outlet 26 and toward the pump element 14.

A relatively clean filter element 34 will cause a relatively small pressure drop across the filter element 34, while as the filter element 34 collects contaminants the pressure drop across the filter element 34 will increase. If not monitored and actively managed, the filter element 34 may block a significant amount of the fluid flow thus starving the pump element 14 of fluid. The pressure drop across the filter element 34 is monitored by a delta pressure sensor 36 located at the filter housing 22, in some embodiments, embedded in the housing sidewall 28 or the end cover 30. The pressure drop signal detected by the delta pressure sensor 36 is output via an output harness 48. The delta pressure sensor 36 includes sense lines 44 which extend into an interior volume 50 of the filter assembly 20 to directly measure the pressure drop across the filter element 34. The delta pressure sensor 36 senses a pressure drop of the fluid flow across the filter element 34, with a pressure drop exceeding a preselected threshold indicative of the need to perform maintenance on or replacement of the filter element 34. It is desired to locate the sense lines 44 within the interior volume 50 and as far away from the turbulent flow of the housing inlet 24 and the housing outlet 26 as possible. Further, the relatively large volume of fluid in the interior volume 50 attenuates any pressure ripple typically observed when the sense lines are located elsewhere. Locating the delta pressure sensor 36 at the filter housing 22 allows for direct measurement of the pressure drop across the filter element 34, compared to indirect measurement schemes of the prior art, and eliminates long sense lines and sense lines at the inlet and outlet ports of the filter assembly of such indirect measurement schemes.

Figure 3A:
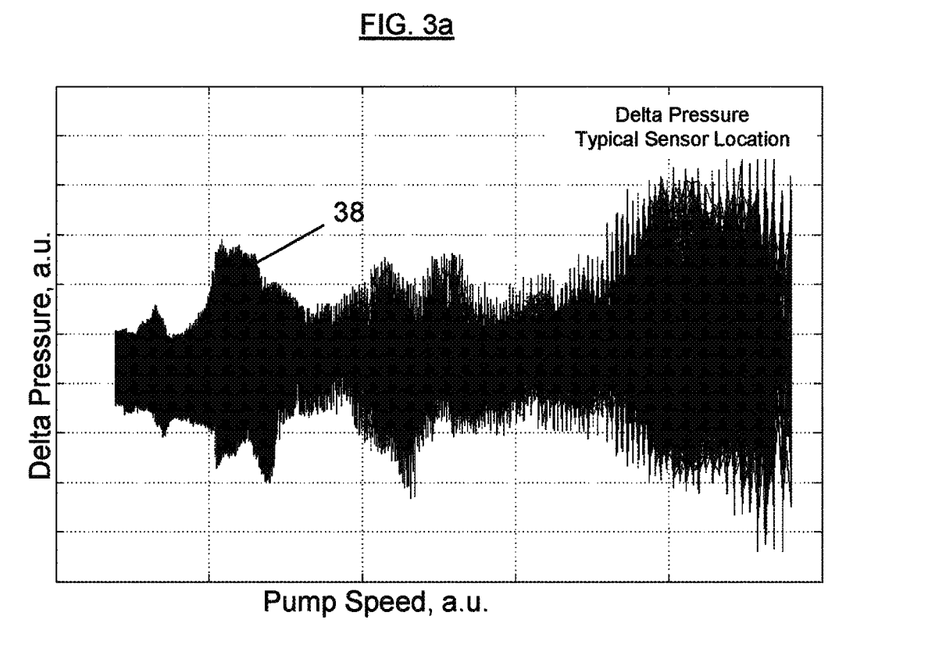
FIG. 3a is a graphical representation of pressure ripple effects of the typical prior art system.
Figure 3B:
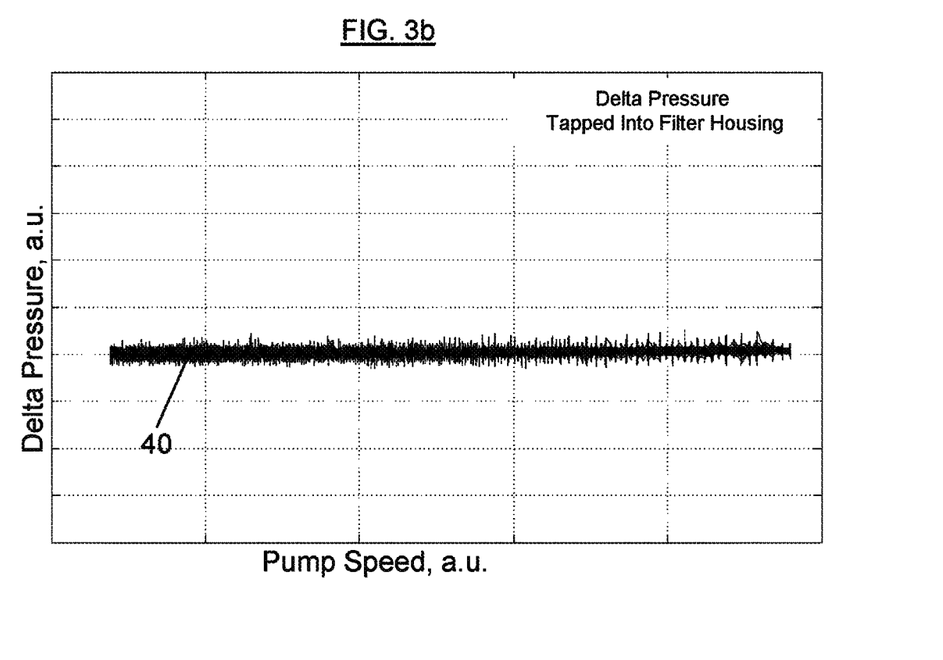
FIG. 3b is a graphical representation of effects of the presently disclosed system.

Further, as shown in FIG. 2, locating the delta pressure sensor 36 at the filter housing 22 shields the measurement of pressure drop across the filter element 34 from pressure ripples in the fluid flow caused by the pump element 14 as shown in FIGS. 3a and 3b.

Pump elements 14, such as external gear fuel pumps can create both flow and pressure oscillations. These oscillations are typically related to the pump element 14 shaft rotational speed, thus varying the forced oscillation frequency within the fluid system. Flow lines, such as fluid pathway 12, as well as sense lines can have dynamics that react adversely to these perturbations, corrupting the sensed signal due to nonlinear effects of the flow passages and sense lines, and sense line/sensor volume combination, as well as frequency resonances and their unwanted effects. As a consequence, one or more sense lines may be affected over the entire fluid system's operating range.

Oscillation can couple with the natural frequency of the sense line thus leading to amplified cyclic pressures within a sense line. This can result in erroneous pressure readings that can skew the detected pressure signal. Peak pressures due to spikes, and in particular, the resulting amplification by system dynamics, can damage parts in the fluid flow system 10.

Locating delta pressure sensor 36 at the filter housing 22, can optimize flow path dynamics and also can provide the means to measure pressures that have much reduced levels of signal perturbations.

A simulation of the effects of the location of the delta pressure sensor is shown in FIGS. 3a and 3b. In FIG. 3a, the data show delta-pressure signals from a typical pressure sensor with sense lines located remotely from the filter assembly and represented at 38. In FIG. 3b, delta pressure signals from a delta pressure sensor with sense lines extending into the interior volume 50 of the filter assembly 20, are represented at 40. The delta-pressure signals 38, 40 (arbitrary units) are plotted along the respective ordinates with identical scaling. Both delta-pressure signal curves are plotted with respect to fuel pump speed (arbitrary units) along the respective abcissas with identical scaling for a true comparison. The advantages of the location of the pressure filter and sense lines 44 at the filter housing 22 (as shown in FIG. 2) indicate that most of the unwanted pressure ripple effects have been effectively attenuated by the presence of the large volume of fluid present at the filter housing 22. The analysis shows that in essence this added volume acts as a "settling chamber" allowing clear pressure signal detection by the delta pressure sensor 36 located in the filter housing 22 as shown in FIG. 2. Additionally, the analysis shows that minimized sense line length decouples the response of the sense lines from matching the pressure ripple frequency resulting in no amplification of the attenuated pressure ripple in the filter housing volume.

Figure 4:
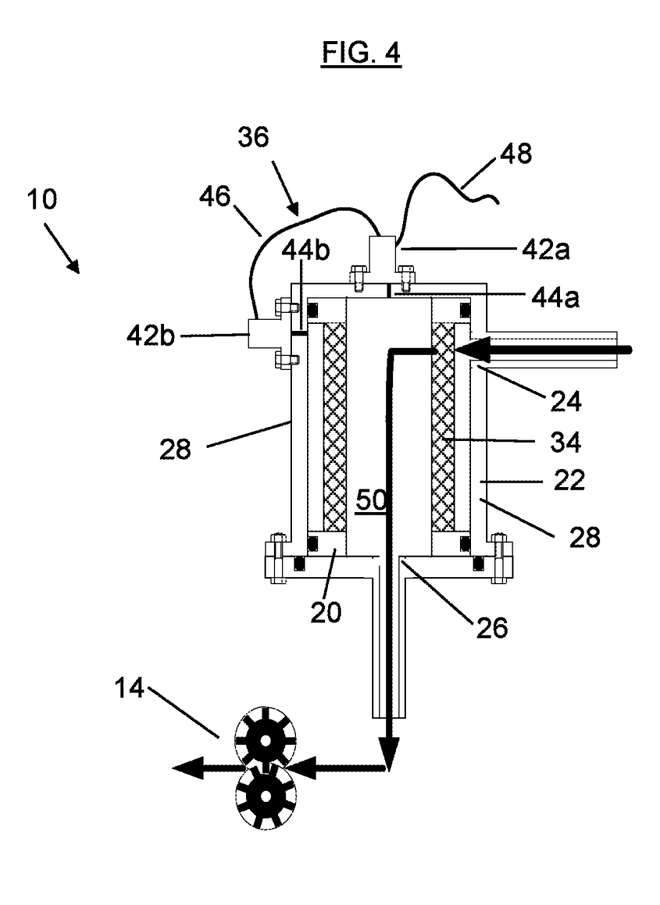
FIG. 4 is a schematic view of another embodiment of a filter and pressure monitor system for a fluid flow system of an aircraft.

Referring now to FIG. 4 another embodiment of a fluid flow system 10 is shown. In this embodiment, delta pressure sensor 36 includes two half-bridge pressure sensors 42a, 42b. First half-bridge pressure sensor 42a is located at housing end 52, with a first sense line 44a extending through housing end 52 to the interior volume 50 of the filter housing 22. Similarly, second half-bridge pressure sensor 42b is located at the housing sidewall 28, with a second sense line 44b extending through the housing sidewall 28 into the interior volume 50 of the filter housing 22. The two half-bridge pressure sensors 42a, 42b are connected via a pigtail harness 46 and the measured pressures are summed at pressure sensor 42a to arrive at a delta pressure measurement across the filter element 34. The half-bridge pressure sensors 42a, 42b are further connected to an electronic engine control (not shown) to which the delta pressure across the filter element 34, the difference between the pressures measured by the two half-bridge pressure sensors 42a, 42b, is output via an output harness 48 connected to either of the two half-bridge pressure sensors 42a, 42b. This approach minimizes the length of both sense lines 44a, 44b, while in embodiments utilizing a single delta pressure sensor 36, one sense line will necessarily be longer than the other sense line. As an alternative to utilizing two half-bridge pressure sensors 42a and 42b, two absolute pressure sensors may be utilized in a similar way. In operation, fluid flow enters the filter housing 22 via the housing inlet 24 and flows across the filter element 34, which captures contaminants in the fluid flow and removes them from the fluid flow. The fluid flow proceeds out of the filter housing 22 via the housing outlet 26 and toward the pump element 14.

Figure 5:
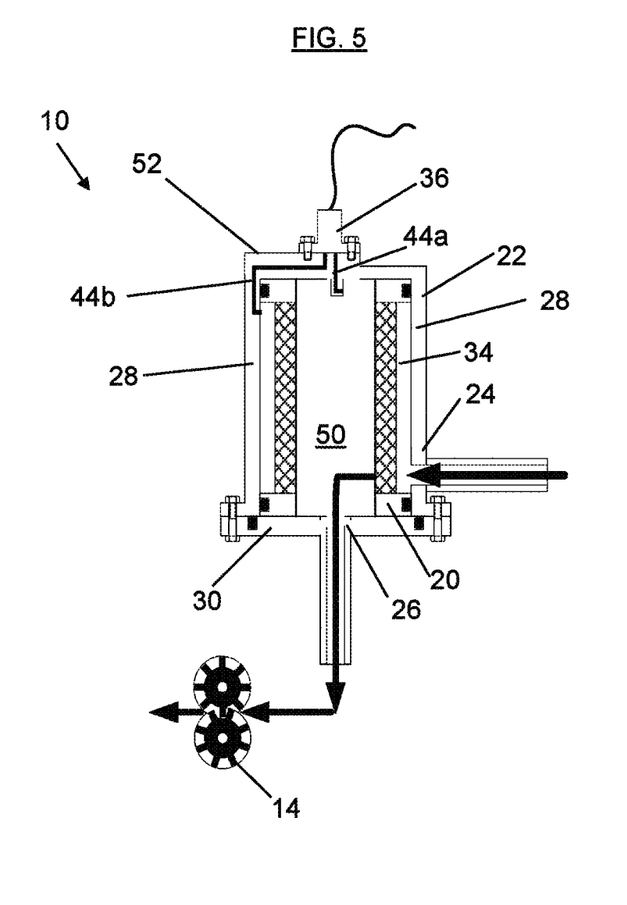
FIG. 5 is a schematic view of yet another embodiment of a filter and pressure monitor system for a fluid flow system of an aircraft.

Referring now to the embodiment of FIG. 5, it is proposed to locate the delta pressure sensor 36 at a location of the filter housing 22 as far away as practicable from the filter housing inlet 24 and the housing outlet 26. Thus the delta pressure sensor's 36 associated sense lines 44a, 44b will be far away from forced flow disturbances present at the housing inlet 24 and the housing outlet 26 due to sudden contraction and expansion, respectively, of the fluid flow at these locations, thus improving accuracy of the delta pressure measurement. As shown in FIG. 5, in an embodiment, the housing outlet 26 is located at end cover 30, and the filter housing inlet 24 is located at the filter housing sidewall 28, at a location nearer to the end cover 30 than to the housing end 52. The delta pressure sensor 36 is located at the housing end 52, with the associated sense lines 44a and 44b located at the housing end 52 and the housing sidewall 28 nearer to the housing end 52 than to the end cover 30.

Benefits of the delta pressure sensor arrangement disclosed herein include, but are not limited to, allowing direct measurement of delta pressure across the filter element 34, reducing sense line length compared to prior systems, reducing inaccuracies by avoiding measurement at or near the inlet port 24 and outlet port 26, and reducing pressure signal distortion due to the pressure ripples in the operation of the pump element 14. Further, the arrangement reduces the potential for damage to pressure sensors as they are now isolated from pressure ripple effects.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A filter assembly for a fluid flow system, comprising:
   a filter housing including:
      a housing end;
      a housing sidewall extending from the housing end; and
      an end cover secured to the housing sidewall opposite the housing end;
   a housing inlet located at the housing sidewall in a location closer to the end cover than to the housing end, to allow a fluid flow into the filter housing;
   a housing outlet located at the end cover to allow the fluid flow to exit the filter housing;
   a filter element disposed in the filter housing to collect contaminants from the fluid flow; and
   a pressure sensor disposed to measure a pressure drop across the filter element, the pressure sensor having at least two sense lines, a first sense line extending through the housing end into an interior volume of the filter housing, and a second sense line extending through the housing sidewall into the interior volume of the filter housing, the first sense line and the second sense line each configured to directly measure the pressure drop across the filter element;
   wherein the filter element is annular in shape, the first sense line extending into an interior of the annular shape and the second sense line disposed between the filter element and the housing sidewall.

2. The filter assembly of claim 1, wherein the measured pressure drop is indicative of an amount of blockage of the filter element due to the contaminants collected at the filter element.

3. The filter assembly of claim 1, wherein the pressure sensor is disposed at the filter housing.

4. The filter assembly of claim 1, wherein the pressure sensor comprises:
   a first half-bridge pressure sensor; and
   a second half-bridge pressure sensor, the first half-bridge pressure sensor and the second half-bridge pressure sensor operably connected to output the pressure drop across the filter element.

5. The filter assembly of claim 1, wherein the pressure sensor comprises:
   a first absolute pressure sensor; and
   a second absolute pressure sensor, the first absolute pressure sensor and the second absolute pressure sensor operably connected to output the pressure drop across the filter element.

6. A fluid flow system comprising:
   a fluid pathway;
   a pump element disposed at the fluid pathway to urge a fluid flow through the fluid pathway;
   a filter assembly disposed at the fluid pathway upstream of the pump element relative to a direction of fluid flow through the fluid pathway, the filter assembly including:
      a filter housing including:
         a housing end;
         a housing sidewall extending from the housing end; and
         an end cover secured to the housing sidewall opposite the housing end;
      a housing inlet located at the housing sidewall in a location closer to the end cover than to the housing end, and connected to the fluid pathway to allow the fluid flow into the filter housing from the fluid pathway;
      a housing outlet located at the end cover, and connected to the fluid pathway to allow the fluid flow to exit the filter housing and back to the fluid pathway to flow toward the pump element;
      a filter element disposed in the filter housing to collect contaminants from the fluid flow; and
      a pressure sensor disposed to measure a pressure drop across the filter element, the pressure sensor having at least two sense lines, a first sense line extending through the housing end into an interior volume of the filter housing, and a second sense line extending through the housing sidewall into the interior volume of the filter housing, the first sense line and the second sense line each configured to directly measure the pressure drop across the filter element.

7. The fluid flow system of claim 6, wherein the measured pressure drop is indicative of an amount of blockage of the filter element due to the contaminants collected at the filter element.

8. The fluid flow system of claim 6, wherein the pressure sensor is disposed at the filter housing.

9. The fluid flow system of claim 6, wherein the pressure sensor comprises:
   a first half-bridge pressure sensor; and
   a second half-bridge pressure sensor, the first half-bridge pressure sensor and the second half-bridge pressure sensor operably connected to output the pressure drop across the filter element.

10. The fluid flow system of claim 6, wherein the pressure sensor comprises:
    a first absolute pressure sensor; and a second absolute pressure sensor, the first absolute pressure sensor and the second absolute pressure sensor operably connected to output the pressure drop across the filter element.

11. The fluid flow system of claims 6, wherein the pump element is an external gear pump.

12. The fluid flow system of claim 6, wherein the fluid flow system is a fuel system for an aircraft.

13. The fluid flow system of claim 6, wherein the fluid pathway extends from a fuel tank to an aircraft engine.

14. A method of monitoring a filter assembly for a fluid flow system comprising:
- positioning a pressure sensor at a filter assembly;
- extending at least two sense lines from the pressure sensor into an internal volume of a filter housing of the filter assembly, the filter housing including a housing end, a housing sidewall extending from the housing end, and an end cover secured to the housing sidewall opposite the housing end, a first sense line extending through the housing end into an interior volume of the filter housing, and a second sense line extending through the housing sidewall into the interior volume of the filter housing, the first sense line and the second sense line each configured to directly measure a pressure drop across a filter element disposed in the filter housing; and
- measuring a pressure drop across a filter element of the filter assembly via the pressure sensor;
- wherein the measured pressure drop is indicative of an amount of blockage of the filter element due to contaminants collected at the filter element;
- wherein a housing inlet is located at the housing sidewall in a location closer to the end cover than to the housing end, to allow a fluid flow into the filter housing; and
- wherein a housing outlet is located at the end cover to allow the fluid flow to exit the filter housing.

15. The method of claim 14, further comprising comparing the measured pressure drop to a selected threshold, and performing maintenance or replacement operations on the filter assembly if the measured pressure drop exceeds the threshold.

16. The method of claim 14, further comprising:
- measuring a first pressure via a first half-bridge pressure sensor disposed at the filter housing;
- measuring a second pressure via a second half-bridge pressure sensor disposed at the filter housing, a difference between the first pressure and the second pressure defining the pressure drop across the filter element, the first half-bridge pressure sensor and the second half-bridge pressure sensor together defining the pressure sensor.

17. The filter assembly of claim 1, wherein the first sense line is disposed at a first side of the filter element and the second sense line is disposed at a second side of the filter element opposite the first side.

18. The filter assembly of claim 1, wherein the filter element is annular in shape, the first sense line extending into an interior of the annular shape and the second sense line disposed between the filter element and the housing sidewall.

* * * * *